US012148272B2

(12) United States Patent
Liu et al.

(10) Patent No.: US 12,148,272 B2
(45) Date of Patent: Nov. 19, 2024

(54) SYSTEM AND METHOD OF RETRIEVING A LOST ITEM

(71) Applicant: GM Global Technology Operations LLC, Detroit, MI (US)

(72) Inventors: Ke Liu, Lexington, MA (US); Jingyan Wan, Sterling Heights, MI (US); Ron Hecht, Raanana (IL); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 552 days.

(21) Appl. No.: 17/587,229

(22) Filed: Jan. 28, 2022

(65) Prior Publication Data

US 2023/0245517 A1 Aug. 3, 2023

(51) Int. Cl.
*G07F 9/02* (2006.01)
*G06T 7/70* (2017.01)
*G07F 9/00* (2006.01)

(52) U.S. Cl.
CPC ............... *G07F 9/026* (2013.01); *G06T 7/70* (2017.01); *G07F 9/006* (2013.01); *G07F 9/009* (2020.05); *G06T 2207/30268* (2013.01)

(58) Field of Classification Search
CPC ............... G06Q 10/083; G06Q 10/087; G06T 2207/30268; G06T 7/70; G07F 17/10; G07F 17/12; G07F 17/13; G07F 9/006; G07F 9/009; G07F 9/026
See application file for complete search history.

(56) References Cited

U.S. PATENT DOCUMENTS

| | | | |
|---|---|---|---|
| 2003/0016130 A1 | 1/2003 | Joao | |
| 2009/0295921 A1* | 12/2009 | Fujita | B60R 1/23 348/148 |
| 2012/0068813 A1* | 3/2012 | Karttaavi | G01S 13/74 340/5.2 |
| 2018/0114134 A1* | 4/2018 | Alva | G06Q 50/26 |
| 2018/0197029 A1* | 7/2018 | Ali | G06V 20/59 |

OTHER PUBLICATIONS

Utexas, Cylindrical and Spherical Coordinates, Apr. 15, 2021, pp. 1-4. (Year 2021).

* cited by examiner

*Primary Examiner* — Omer S Khan
(74) *Attorney, Agent, or Firm* — Vivacqua Crane, PLLC

(57) ABSTRACT

A method of retrieving a lost item from a compartment to an owner of the lost item is provided. The method comprises detecting the lost item in the compartment to define an item image of the lost item relative to the compartment, updating an inventory list of lost objects, and identifying at least one potential user of the lost item. The method further comprises providing notification to the at least one potential user and providing viewable access of the item image. The method further comprises verifying ownership of the lost item to define the owner of the lost item, determining a preferred pickup location for the owner, storing the lost item at the preferred location defining a stored item, and confirming identity of the owner for retrieval of the stored item at the preferred location. The method further comprises allowing access to the stored item from the preferred location.

18 Claims, 4 Drawing Sheets

SYSTEM AND METHOD OF RETRIEVING A LOST ITEM

INTRODUCTION

The present disclosure relates to retrieving lost items left in compartments and more particularly systems and methods of detecting a lost item in a vehicle compartment and retrieving the lost item from a storage facility.

As the automotive industry continues with technological advancements, especially in shared vehicles, there will be a continued increase in vehicles with multiple users. With the increase in multiple users of vehicle and area, a likelihood of lost items increases as well.

SUMMARY

Thus, while current ways of detecting a lost item, notifying an owner thereof, and retrieving the lost item achieve their intended purposes, there is a need for a new and improved system and method of retrieving a lost item left in a vehicle compartment or area. Such technology can be widely applied in public areas to help owners retrieve their lost items effectively and efficiently.

In accordance with one aspect of the present disclosure, a method of retrieving a lost item from a compartment to an owner of the lost item is provided. The method comprises providing at least one sensor to sense the lost item in the compartment and detecting the lost item in the compartment to define an item image of the lost item relative to the compartment. The method further comprises updating an inventory list of lost objects to include the lost item with the item image and identifying at least one potential user of the lost item by way of a perception algorithm. The method further comprises providing notification to the at least one potential user of the lost item and providing viewable access of the item image such that the image is viewed by the at least one potential user of the lost item.

In this aspect, the method further comprises verifying ownership of the lost item to define the owner of the lost item and determining a preferred pickup location for the owner. The method further comprises storing the lost item at the preferred location defining a stored item and confirming identity of the owner for retrieval of the stored item at the preferred location. The method further comprises allowing access to the stored item from the preferred location upon identity confirmation.

In one example of the present disclosure, the step of detecting the lost item comprises sensing the lost item on a point relative to a spherical coordinate system to define a sensed item data and determining a position of the lost item in cartesian coordinates based on the sensed item data to define a position data. The step of detecting further comprises translating the sensed item data and the position data for visualization of the lost item to define the item image of the lost item relative to the compartment.

In this example, the point relative to the spherical coordinate system is defined by a distance r, a first angle ($\theta$), and a second angle ($\varphi$), wherein the lost item has cartesian coordinates having an x-axis, a y-axis, and a z-axis derived as, $$x = r \sin\theta \cos\varphi$$

$$y = r \sin\theta \sin\varphi$$

$$z = r \cos\theta$$

In another example, the step of determining the position of the lost item comprises the sensor being arranged to have two of roll, pitch, and yaw rotational movements when the sensor senses in a fixed location in the compartment.

In yet another example, the step of determining the position of the lost item comprises the sensor being arranged to have one of roll, pitch, and yaw rotational movements when the sensor senses in movement along the x-axis such that the first angle $\theta$ is calculated as:

$$\theta = \sin^{-1}\frac{x}{r \cdot \cos\varphi}.$$

In still another example, the step of determining the position of the lost item comprises the sensor being arranged to have one of roll, pitch, and yaw rotational movements when the sensor senses in movement along the x-axis and y-axis such that the second angle $\varphi$ is calculated as:

$$\varphi = \tan^{-1}\left(\frac{y}{x}\right).$$

In one example, the step of verifying comprises assessing the item image, the sensed item data, and the position data of the lost item and requesting with the at least one potential user a first description of the lost item relative to one of the item image, the sensed item data, and the position data. The step of verifying further comprises receiving the first description of the lost item and comparing the first description with one of the item image, the sensed item data and the position data. Furthermore, the step of verifying comprises confirming the owner of the lost item if the first description is uniquely consistent with one of the item image, the sensed item data, and the position data.

In another example, the step of verifying further comprises requesting with the at least one potential user a second description of the lost item relative to one of the item image, the sensed item data, and the position data if the first description is not uniquely consistent with one of the item image, the sensed item data, and the position data. The step of verifying further comprises receiving the first description of the lost item and comparing the second description with one of the item image, the sensed item data and the position data. Furthermore, the step of verifying comprises confirming the owner of the lost item when the second description is uniquely consistent with one of the item image, the sensed item data, and the position data.

In yet another example, the step of determining the preferred location comprises providing the owner with at least one location from which to select for retrieval of the lost item. The step of determining the preferred location comprises receiving from the owner a selection of one location from where to retrieve the lost item to define the preferred location.

In still another example, the at least on sensor is one of an ultrasonic sensor, an RFID sensor, or any other suitable sensor.

In one example, the step of identifying the owner of the lost item comprises scanning the compartment, detecting the user in the compartment, and pairing the user with the lost item by way of the perception algorithm.

In accordance with another aspect of the present disclosure, a system for notifying an owner of a lost item in a vehicle having a compartment is provided. The system comprises at least one sensor disposed in the compartment and arranged to sense the lost item on a point relative to a spherical coordinate system to define a sensed item data.

In this aspect, the system further comprises an electronic control unit (ECU) disposed in the vehicle and in communication with the at least one sensor. The ECU is arranged to determine a position of the lost item in cartesian coordinates based on the sensed item data to define a position data. Moreover, the ECU is arranged to translate the sensed item data and the position data for visualization of the lost item to define an item image of the lost item relative to the compartment. Additionally, the ECU is arranged to update an inventory list of lost objects to include the lost item with the item image. Furthermore, the ECU arranged to identify at least one potential user of the lost item by way of a perception algorithm.

The system further comprises a cloud server disposed remotely from the vehicle and in communication with the ECU. In this aspect, the cloud server is arranged to provide notification to the at least one potential user of the lost item. The cloud server is further arranged to provide viewable access of the item image such that the image is viewed by the at least one potential user of the lost item. Moreover, the cloud server is arranged to verify ownership of the lost item to define the owner of the lost item, the cloud server arranged to determine a preferred location of the owner.

The system further comprises a storage facility in which the lost item is stored to define a stored item. The storage facility is disposed at the preferred location and comprises a controller in communication with the cloud server. Moreover, the controller is arranged to confirm an identity of the owner for retrieval of the stored item from the storage facility. Furthermore, the controller is arranged to allow access to the stored item from the storage facility upon identity confirmation.

In an embodiment, the point relative to the spherical coordinate system is defined by a distance r, a first angle ($\theta$), and a second angle ($\varphi$), wherein the lost item has cartesian coordinates having an x-axis, a y-axis, and a z-axis derived as, $x = r \sin \theta \cos \varphi$ $y = r \sin \theta \sin \varphi$ $z = r \cos \theta$ In one embodiment, the ECU is arranged to determine a position of the lost item comprises the sensor being arranged to have two of roll, pitch, and yaw rotational movements when the sensor senses in a fixed location in the compartment.

In another embodiment, the ECU is arranged to determine a position of the lost item comprises the sensor being arranged to have one of roll, pitch, and yaw rotational movements when the sensor senses in movement along the x-axis such that the first angle $\theta$ is calculated as:

$$\theta = \sin^{-1} \frac{x}{r \cdot \cos \varphi}.$$

In yet another embodiment, the ECU is arranged to determine a position of the lost item comprises the sensor being arranged to have one of roll, pitch, and yaw rotational movements when the sensor senses in movement along the x-axis and y-axis such that the second angle $\varphi$ is calculated as:

$$\varphi = \tan^{-1}\left(\frac{y}{x}\right).$$

In an embodiment, the cloud server being arranged to verify ownership of the lost item includes the cloud server being arranged to assess the item image, the sensed item data, and the position data of the lost item. In this embodiment, the cloud server is arranged to request with the at least one potential user a first description of the lost item relative to one of the item image, the sensed item data, and the position data. Moreover, the cloud server is arranged to receive the first description of the lost item. Additionally, the cloud server is arranged to compare the first description with one of the item image, the sensed item data and the position data, Furthermore, the cloud server is arranged to confirm the owner of the lost item if the first description is uniquely consistent with one of the item image, the sensed item data, and the position data.

In another embodiment, the cloud server being arranged to verify ownership of the lost item further includes the cloud server being arranged to request with the at least one potential user a second description of the lost item relative to one of the item image, the sensed item data, and the position data if the first description is not uniquely consistent with one of the item image, the sensed item data, and the position data.

In this embodiment, the cloud server is arranged to receive the first description of the lost item. Moreover, the cloud server is arranged to compare the second description with one of the item image, the sensed item data and the position data. Additionally, the cloud server is arranged to confirm the owner of the lost item when the second description is uniquely consistent with one of the item image, the sensed item data, and the position data.

In yet another embodiment, the cloud server being arranged to determine a preferred location of the owner includes the cloud server being arranged to provide the owner with at least one location from which to select for retrieval of the lost item. Moreover, the cloud server is arranged to receive from the owner a selection of one location from where to retrieve the lost item.

The at least one sensor is one of an ultrasonic sensor, an RFID sensor, or any other suitable sensor.

In accordance with another aspect of the present disclosure, a method of retrieving a lost item in a compartment for an owner of the lost item is provided. The method comprises providing at least one sensor to sense the lost item in the vehicle compartment and sensing the lost item on a point relative to a spherical coordinate system to define a sensed item data. The point is defined by a distance r, a first angle ($\theta$), and a second angle ($\varphi$), wherein the lost item has cartesian coordinates having an x-axis, a y-axis, and a z-axis derived as, $x = r \sin \theta \cos \varphi$ $y = r \sin \theta \sin \varphi$ $z = r \cos \theta$ The method further comprises determining a position of the lost item in cartesian coordinates based on the sensed item data to define a position data. In this aspect, the sensor is arranged to have two of roll, pitch, and yaw rotational movements when the sensor senses in a fixed location in the vehicle compartment. Moreover, the sensor is arranged to have one of roll, pitch, and yaw rotational movements when the sensor senses in movement along the x-axis such that the first angle θ is calculated as:

$$\theta = \sin^{-1}\frac{x}{r \cdot \cos\varphi},$$

Additionally, the sensor is arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

The method further comprises translating the sensed item data and the position data for visualization of the lost item to define an item image of the lost item relative to the vehicle compartment. The method further comprises updating an inventory list of lost objects to include the lost item with the item image and identifying the owner of the lost item by way of a perception algorithm. The method further comprises providing notification to the owner of the lost item and providing viewable access of the item image such that the image is viewed by the owner of the lost item.

In this aspect, the method further comprises verifying ownership of the lost item to define the owner of the lost item and determining a preferred pickup location for the owner. Moreover, the method further comprises storing the lost item at the preferred location defining a stored item and confirming identity of the owner for retrieval of the stored item at the preferred location. Furthermore, the method comprises allowing access to the stored item from the preferred location upon identity confirmation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The following description is merely exemplary in nature and is not intended to limit the present disclosure, application, or uses.

Embodiments and examples of the present disclosure provide systems and methods of retrieving a lost item from a compartment to an owner of the lost item, particularly from a lost item in a vehicle compartment. The embodiments and examples provide efficient, accurate, and cost effective ways of identifying a lost item, notifying an owner thereof, and assessing a preferred location from which the owner to retrieve the lost item. Such examples will not require new hardware on most existing vehicles and will not require additional hardware on new vehicles.

Figure 1:
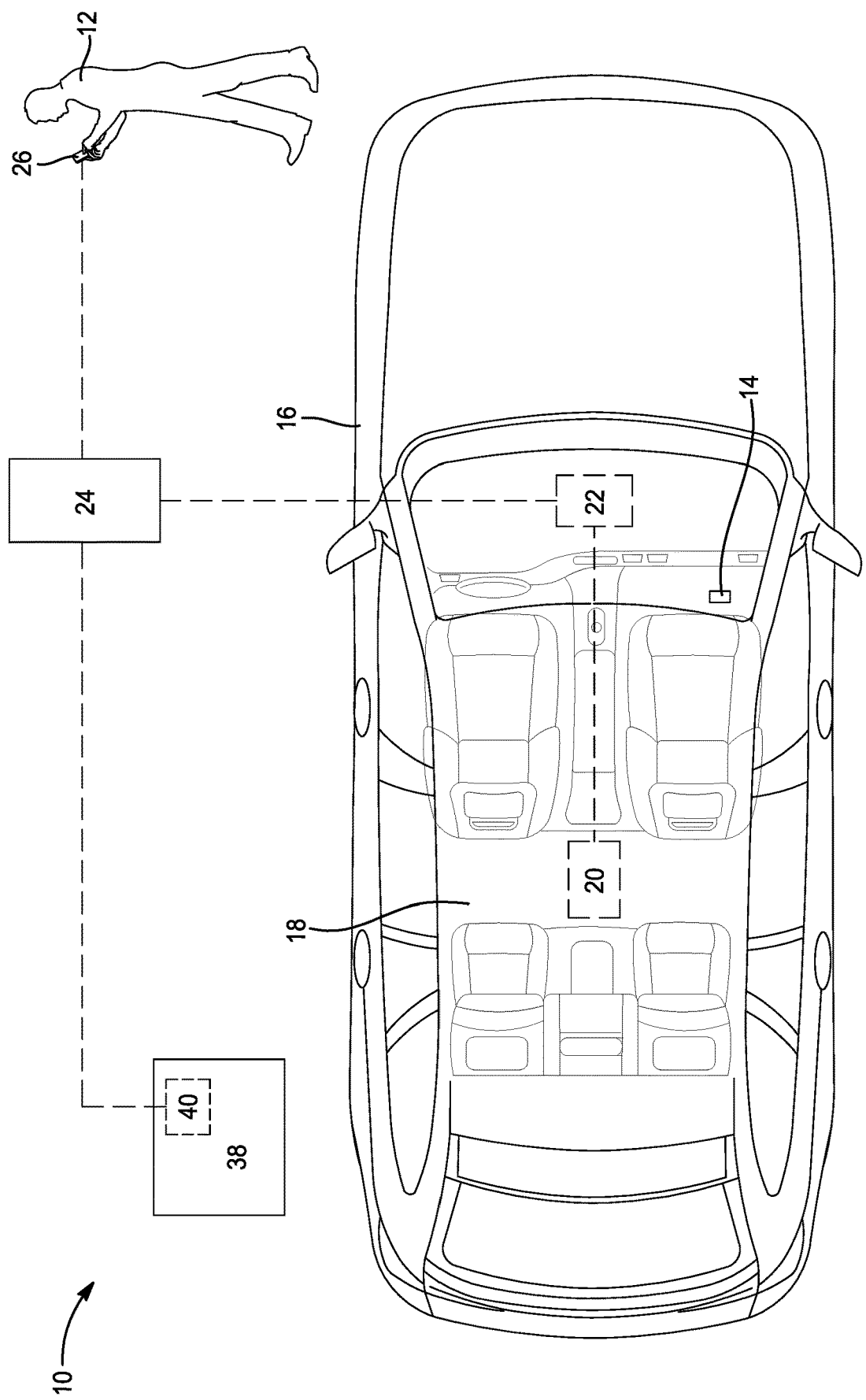
FIG. 1 is a schematic view of a system for retrieving a lost item from a compartment to an owner of the lost item in accordance with one embodiment of the present disclosure.

FIG. 1 depicts a system 10 for retrieving a lost item 14 from a compartment 18 to an owner 12 of the lost item 14 in accordance with one embodiment of the present disclosure. In this embodiment, a vehicle 16 comprises the compartment 18. However, a seating/standing area in a theater, restaurant, lounge, lobby or any suitable area may be applicable without departing from the spirit or scope of the present disclosure. As shown, the system 10 comprises at least one sensor 20, an electronic control unit (ECU) 22 in communication with the sensor 20, a cloud server 24 in communication with the ECU 22, and a preferred location 25 having a controller 27 in communication with the cloud server 24. Moreover, the cloud server 24 is in communication with a handheld device 26 of the owner 12.

Figure 2:
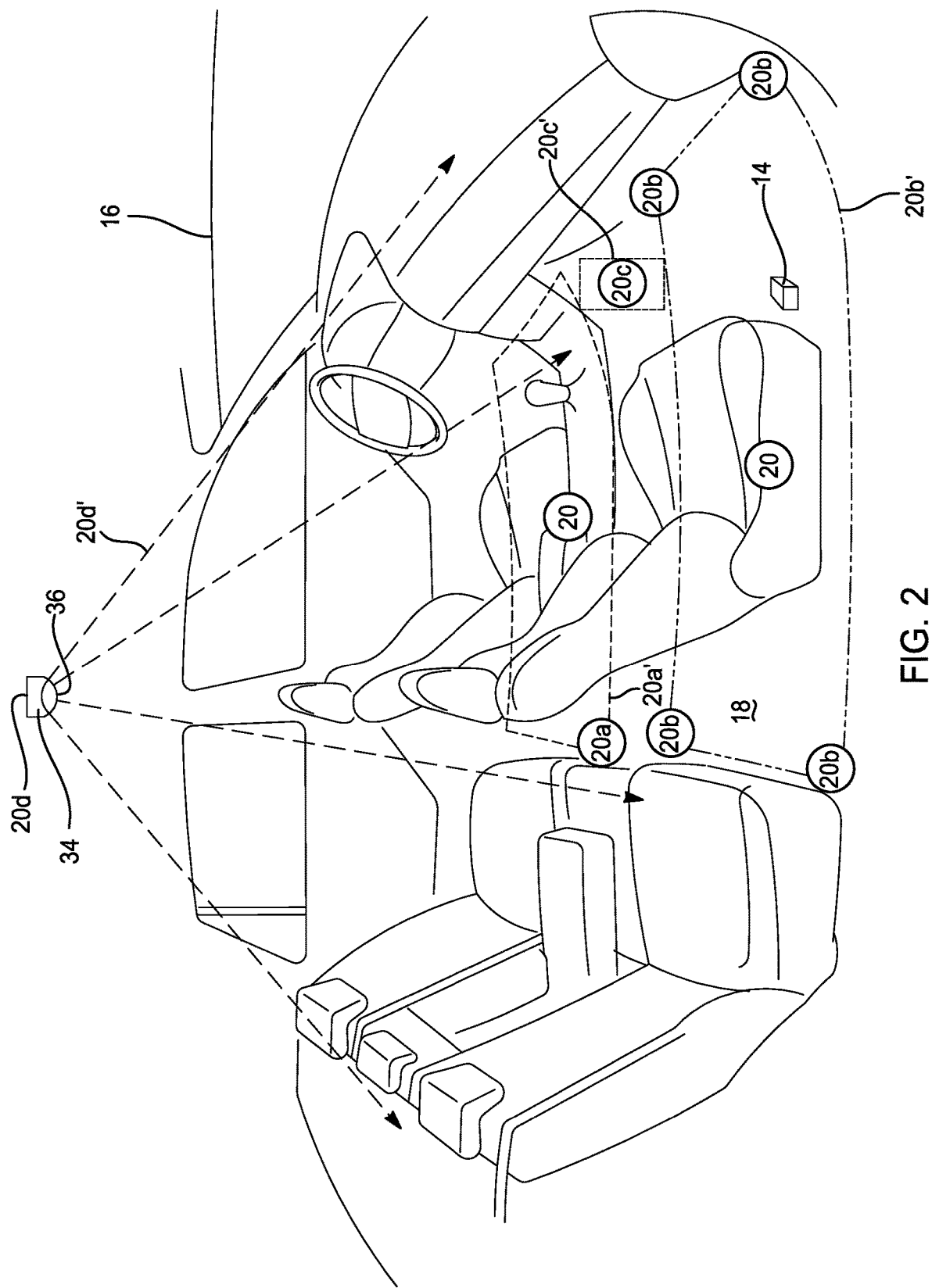
FIG. 2 is a perspective side view of a vehicle compartment in which the system of FIG. 1 is implemented in accordance with one example.

As illustrated in FIGS. 1-2, the at least one sensor 20 (e.g., an ultrasonic sensor) is disposed in the vehicle compartment 18. In the embodiment shown in FIG. 2, there are a plurality of sensors (20, 20a, 20b, 20c, 20d) disposed within the vehicle compartment 18 and having detection zones 20', 20a', 20b', 20c', 20d'. That is, the sensors may be disposed on the ceiling, the floor, the console, the interior panel, or in any other suitable location in the vehicle compartment 18 without departing from the spirit or scope of the present disclosure.

Figure 3:
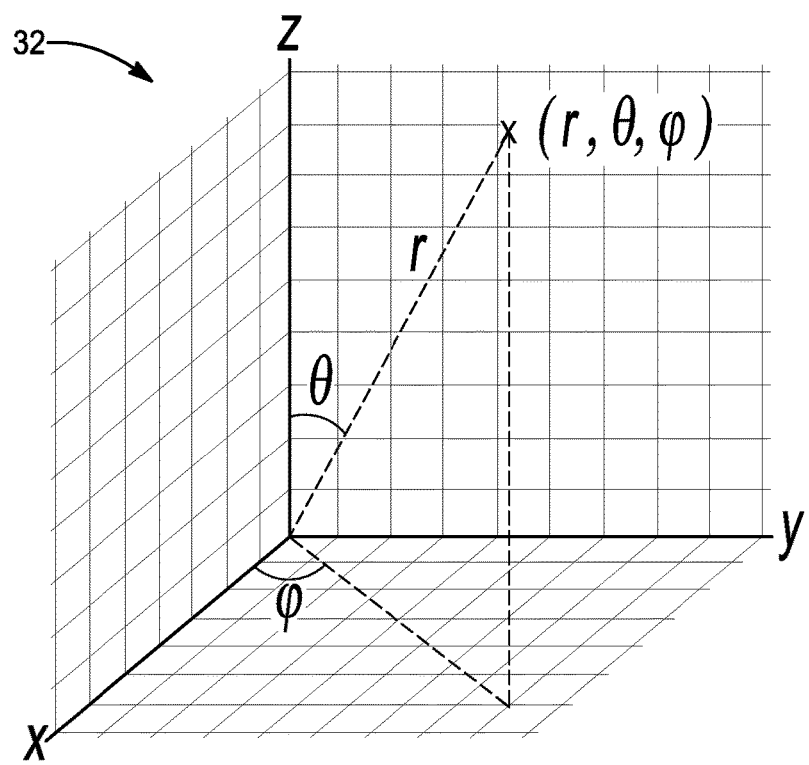
FIG. 3 is a graph of a spherical coordinate system from cartesian coordinates are derived for a lost item in one example.

As discussed in greater detail below, the sensor 20 may be arranged to sense the lost item 14 on a point 30 relative to a spherical coordinate system 32 in FIG. 3 to define a sensed item data. In one embodiment, the point 30 relative to the spherical coordinate system 32 is defined by a distance r, a first angle (θ), and a second angle (φ). Moreover, the lost item 14 may be translated in cartesian coordinates having an x-axis, a y-axis, and a z-axis derived as, $x = r \sin\theta \cos\varphi$ $y = r \sin\theta \sin\varphi$ $z = r \cos\theta$ In one example, the sensor 20 is arranged to have two of roll, pitch, and yaw rotational movements when the sensor 20 senses from a fixed location in the vehicle compartment 18. That is, the sensor 20 may have a body 34 fixedly disposed in the vehicle compartment 18 and a lens 36 disposed within the body 34. Moreover, the lens 36 may be arranged for rotational movements, e.g., roll, pitch, and yaw, during operation.

In another example, the sensor 20 is arranged to have one of roll, pitch, and yaw rotational movements when the sensor 20 senses in translational movement along the x-axis such that the first angle θ is calculated as:

$$\theta = \sin^{-1}\frac{x}{r \cdot \cos\varphi}.$$

Translational movement of the sensor 20 may include forward/backward movement, side to side movement, and up/down movement. Thus, a sensor body 34 may be disposed in the vehicle compartment 18 and arranged to be movable along one of the x-axis, y-axis, and z-axis for translational movement. As an example, the sensor 20 may have a body 34 movably disposed along a linear track (forward/backward movement) on a portion of an interior panel of the vehicle compartment 18. A lens 36 may be disposed within the body 34 and arranged for rotational movements, e.g., roll, pitch, and yaw.

In yet another example, the sensor 20 is arranged to have one of roll, pitch, and yaw rotational movements when the sensor 20 senses in translational movement along the x-axis and y-axis such that the second angle $\varphi$ is calculated as:

$$\varphi = \tan^{-1}\left(\frac{y}{x}\right).$$

As in the previous embodiment, translational movement of the sensor 20 may include forward/backward movement, side to side movement, and up/down movement. Thus, a sensor body 34 may be disposed in the vehicle compartment 18 and arranged to be movable along the x-axis and y-axis (e.g., forward/backward and side to side movements) for translational movement. For example, the sensor may have a body 34 movably disposed along a circular track on a portion of an interior panel of the vehicle compartment 18. A lens 36 may be disposed within the body 34 and arranged for rotational movement, e.g., roll, pitch, and yaw.

The sensor may be a radio frequency identification (RFID) sensor. That is, the sensor may have an RFID reader and an object may have an RFID tag, allowing the sensor to detect the sensed item data and the position data. The RFID tag may provide readable data of the user and the object thereby providing information as to ownership of the lost item 14 and location/destination of the user.

It is to be understood that the sensor may be an ultrasonic sensor, a radio frequency identification sensor, a radar sensor, or any other suitable sensor without departing from the spirit or scope of the present disclosure.

Referring to FIG. 1, the system 10 further comprises an electronic control unit (ECU) 22 disposed in the vehicle 16. As depicted, the ECU 22 is in communication with the sensor 20 and a handheld device 26 of the owner 12 of the lost item 14. It is to be understood that the ECU 22 comprises modules and algorithms to assist in controlling the system 10.

Moreover, the ECU 22 is arranged to determine a position of the lost item 14 in cartesian coordinates based on the sensed item data to define a position data. The position of the lost item 14 may be determined in a number of ways. For instance, as discussed above in one example, the sensor 20 is arranged to have at least two of roll, pitch, and yaw rotational movements when the sensor 20 senses from a fixed location in the vehicle compartment 18. That is, the sensor 20 may have a body 34 fixedly disposed in the vehicle compartment 18 and a lens 36 disposed within the body 34. Furthermore, the lens 36 may be arranged for rotational movements, e.g., roll, pitch, and yaw, during operation to sense the lost item 14.

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The position of the lost item 14 may be determined in another suitable manner. For instance, as discussed above, the sensor 20 may be arranged to have at least one of roll, pitch, and yaw rotational movements when the sensor 20 senses from translational movement along the x-axis in the vehicle compartment 18 such that the first angle $\theta$ is calculated as:

$$\theta = \sin^{-1}\frac{x}{r \cdot \cos\varphi}.$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The position of the lost item 14 may be determined in yet another suitable manner. For instance, as discussed above in another example, the sensor 20 may be arranged to have at least one of roll, pitch, and yaw rotational movements when the sensor 20 senses from translational movement along the x-axis and y-axis in the vehicle compartment 18 such that the second angle $\varphi$ is calculated as:

$$\varphi = \tan^{-1}\left(\frac{y}{x}\right),$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The ECU 22 is further arranged to translate the sensed item data and the position data for visualization of the lost item 14 to define an item image of the lost item 14 relative to the vehicle compartment 18. Based on the sensed item data and the position data, By way of algorithmic modules, the ECU 22 is able to translate the sensed item and the position data to the item image, thereby providing an image of the lost item 14 along with a location of thereof relative to the sensor 20 in the vehicle compartment 18. It is to be understood that the ECU 22 may comprise modules and algorithms to assist in translating the sensed item data and the position data to output the item image and provide a location of the lost item 14.

Additionally, the ECU 22 is arranged to update an inventory list of lost objects to include the lost item 14 with the item image. The inventory list is preferably stored in the ECU 22 and may comprise a "lost" database of left-behind or lost objects in the vehicle compartment 18. To detect an object has been left-behind or lost, the ECU 22 may comprise an object detection module arranged to compare images of the vehicle compartment 18. Such images may be intermittently captured by the sensor 20 as desired. The object detection module may comprise a first perception algorithm that compares images or data of the vehicle compartment 18. As new objects and new users are detected and paired, data of each new object is record in an object database. Along the same lines, left-behind or lost objects may also be detected as users enter and leave the vehicle compartment 18 with and without their respective objects. Objects detected without the paired users may be determined to be "lost" by way of the first perception algorithm. Data of each "lost" object is recorded in the "lost" database.

Furthermore, the ECU 22 is arranged to identify the owner 12 or at least one potential user of the lost item 14 during a trip of the vehicle 16. Generally, the owner 12 or at least one potential user of a lost item 14 may be identified by the ECU 22 by way of a user detection module. In one example, the user detection module may be arranged to compare images of the vehicle compartment 18. Such images may be intermittently captured by the sensor 20 as desired. The user detection module may comprise a second perception algorithm that compares images or data of the vehicle compartment 18. As new objects and users are detected and paired, data of each new user is recorded in a database. As lost objects are detected, the at least one potential user that is paired with the lost object may be identified by way of the second perception algorithm. Data of each user having a lost object may be recorded in a "user" database. As a result, a number of potential users along with computations are reduced (from a relatively large pool of users) to a workable set for verifying ownership of the lost item (discussed below).

In another example, by way of the ECU 22 with the user detection module, the owner 12 or at least one potential user of a lost item 14 can be identified by recording an identifier of the trip having a trip identification (ID) during which the lost item 14 was detected in the vehicle 16. Subsequently, the trip ID and the owner 12 (or the at least one potential user) of the lost item 14 may be matched through a search in a database of trip IDs and users.

Such matching by the ECU 22 may occur in the following steps. In a first step, a new item in the vehicle 16 is identified upon vehicle entry by the at least one potential user with the new item. The sensor 20 senses and identifies the new item in the vehicle 16. That is, based on a comparison of images/data (e.g., via the user detection module), the new item is identified in the vehicle compartment 18. Thus, the new item had not been present prior to the user entering the vehicle 16.

In a second step, the new item remains in the vehicle after the trip ends and/or the user paired therewith has left the vehicle. By way of a perception algorithm of the ECU 22, the item may be confirmed as a valuable item, e.g., a bag pack, a tablet, a wallet, a bag. In a third step, the item is tagged as "left behind during trip xxx," where xxx is a unique ID of the trip based on time and potentially location such as a start point and an end point.

In a fourth step, the ECU 22 having a user database that matches vehicle users with trip IDs is accessed to match the lost item 14 with its owner 12 or potential user by matching trip ID to user ID. Such database may be the same as or similar to any suitable user database used for identifying users, matching a passenger with a vehicle/driver, and charging the passenger for a pickup/rental service.

Alternatively, there may be other methods of identifying the owner 12 of a left-behind item without departing from the spirit or scope of the present disclosure. One additional method may include situations where the vehicle has an identification mechanism (e.g., for payments or for personalization). When a user enters the vehicle, the user may log in to a vehicle either manually or as detected by an identification mechanism in the vehicle. The vehicle then can keep track of users in the vehicle. Examples of such identification mechanisms include a fingerprint mechanism, face ID using camera mechanism, phone pairing mechanism, and manual login into an infotainment system.

Another method of identifying the owner 12 may include situations where the vehicle records an image of the driver's face, which can be uploaded to a service that then uses facial identification.

Yet another method of identifying the owner 12 may include situations where a manual request from the owner 12 or potential user of the lost item 14 can be used to search within a database of lost items.

In still another method of identifying the owner 12 and within a predefined space, a user's pathway and location of the left-behind object can be generated by the ECU 22 with a location module having a location algorithm. Given that the user's pathway is also the object location before the object is left behind, the location module is arranged to retrieve the object path. The object path is then matched with the user path. As an example, the user path may be obtained by using the user's ticket/cell phone location/facial ID. An object can be assigned to at least one potential user when the user's time stamp of the path overlaps the time of the object path.

Yet another method of identifying the owner 12 may include situations where radio frequency identification (RFID) is used. In such situations, the owner's information can also be included in an RFID tag.

Referring to FIG. 1, the system 10 further comprises a cloud server 24 disposed remotely from the vehicle 16. As shown, the cloud server 24 is in communication with the ECU 22. In a preferred embodiment, the cloud server 24 is arranged to provide notification to the owner 12 of the lost item 14. When the ECU 22 identifies the owner 12 of the lost item 14 as described above, the ECU 22 sends a signal to the cloud server 24 to inform or notify the owner 12 that an item has been left behind in the vehicle compartment 18.

For example, the cloud server 24 may notify a user by way of an application downloaded on the user's handheld device or phone 26. A notification may be sent to the user from the application, informing the user that a lost item 14 has been detected in the vehicle compartment 18 and that the user has been identified as the owner 12 thereof. It is to be understood that the cloud server 24 may notify the owner 12 of a lost item 14 by email, text message, phone call, voice mail, or any other suitable manner without departing from the scope or spirit of the present disclosure.

Moreover, the cloud server 24 is arranged to provide viewable access of the item image such that the image is viewed by the owner 12 of the lost item 14. That is, the ECU 22 may transmit the item image of the lost item 14 to the cloud server 24 which may be downloaded by the user for viewable access. A user may view the item image by way of the phone application. It is to be understood that the cloud server 24 may provide viewable access of the item image by email, text message, or any other suitable manner without departing from the scope or spirit of the present disclosure.

Additionally, the cloud server 24 is arranged to verify ownership of the lost item 14 to define the owner 12 of the lost item 14. That is, the cloud server 24 is arranged to gather and assess at least one of the item image, the sensed item data, and the position data of the lost item. The cloud server 24 is arranged to request with the at least one potential user a first description of the lost item 14 relative to one of the item image, the sensed item data, and the position data.

In one embodiment, the cloud server 24 may request a general or first description of the lost item 14 such as item category (e.g. bag, card, jewelry, garment), shape, color, function, to name a few. Other descriptions may be included without departing from the spirit or scope of the present disclosure. Moreover, the cloud server 24 may send such request to the user's phone by way of a downloadable interactive phone application. Thus, the user may interactively send responses to the cloud server 24 via the application.

As such, the cloud server 24 is arranged to receive the first description from the at least one potential user and compare the first description with one of the item image, the sensed item data and the position data by way of the perception module or by any other suitable algorithmic manner. In turn, the cloud server 24 is arranged to confirm the owner 12 of the lost item if the first description is uniquely consistent with one of the item image, the sensed item data, and the position data. That is, if the first description is accurately described within a predetermined probability (e.g., 75%, 80%, 85%, 90%, 95%, 100%, 75%-100%, or as desired) relative to the assessment of the item image, the sensed item data, or the position data via an algorithmic module, then the item's ownership is verified thereby defining the owner 12 of the lost item 14. In another embodiment, if the cloud server 24 determines that there is only one first description from the at least one user that matches (or is uniquely consistent with) the assessment of the lost item 14, then the item's ownership is verified thereby defining the owner 12 of the lost item 14.

If the first description is not uniquely consistent with one of the item image, the sensed item data, and the position data, then the cloud server 24 is arranged to request with the at least one potential user a second description of the lost item 14 relative to one of the item image, the sensed item data, and the position data. In one situation where the first descriptions from a plurality of potential users are similar or not uniquely consistent with the assessment of the lost item, a second description is requested to each of the plurality of potential users. The second description may include more specific details related to the lost item. Such details may include a variety of specific details such as time of travel, brand of jewelry, size of garment, distinguishable markings on the item, to name a few. Of course, other details may be included without departing from the spirit or scope of the present disclosure.

As such, the cloud server 24 is arranged to receive the second description from the at least on potential user and compare each second description with one of the item image, the sensed item data and the position data via the perception module or by any other suitable algorithmic manner. In turn, the cloud server 24 is arranged to confirm the owner 12 of the lost item 14 if the second description is uniquely consistent with one of the item image, the sensed item data, and the position data. That is, if the second description is accurately described within a predetermined probability (e.g., 75%, 80%, 85%, 90%, 95%, 100%, 75%-100%, or as desired) relative to the assessment of the item image, the sensed item data, or the position data via an algorithmic module, then the item's ownership is verified thereby defining the owner 12 of the lost item 14. In another embodiment, if the cloud server 24 determines that there is only one second description that matches (or is uniquely consistent with) the assessment of the lost item, then the item's ownership is verified thereby defining the owner 12 of the lost item 14.

Further, the cloud server 24 being arranged to determine a preferred location may include the cloud server 24 arranged to provide the owner 12 with at least one area from which to select for retrieval of the lost item. The at least one area may include geographical locations from which a user may select based on preference for retrieval of the lost item 14. A selection list of at least one area may be provided via the interactive phone application mentioned previously. Via the phone application, the cloud server 24 may provide the user with the selection list of the areas from which the user may select. In turn, the cloud server 24 is arranged to receive via the phone application from the owner a selection of one location from where to retrieve the lost item, defining the preferred location.

In this embodiment, the system 10 further comprises a storage facility 38 in which the lost item 14 is stored to define a stored item. The storage facility 38 may include one locker or a colony of designated lockers in which the lost item 14 is stored for retrieval by the owner 12. Preferably, the storage facility 38 is disposed at the preferred location and comprises a controller 40 in communication with the cloud server 24. The controller 40 is arranged to confirm an identity of the owner 12 for retrieval of the stored item from the storage facility. Identity confirmation of the owner 12 may be achieved by facial recognition, fingerprint mechanism, drivers license scan, manual login and password, or any other suitable manner without departing from the spirit or scope of the present disclosure.

Furthermore, the controller 40 is arranged to allow access to and retrieval of the stored item from the storage facility 38 upon identity confirmation. Upon identity confirmation, access to a designated locker in which the lost item is stored is provided to the owner 12 for retrieval of the lost item. It is understood that retrieval of the lost item may be automated, self-service, representative aided, or a hybrid thereof without departing from the spirit or scope of the present disclosure.

Figure 4:
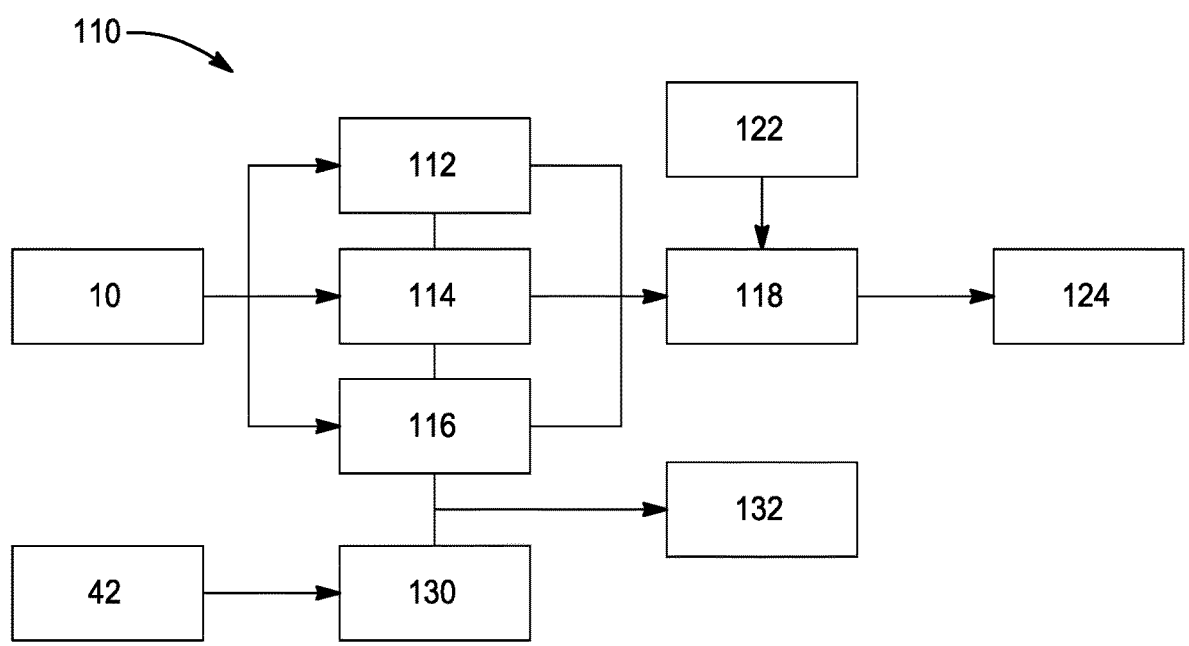
FIG. 4 is a flowchart of a general method of retrieving a lost item from a compartment to an owner of the lost item implemented by the system in FIG. 1.

FIG. 4 shows a flowchart of a general method 110 of retrieving a lost item for the system 10 in FIG. 1 in accordance with one example of the present disclosure. As shown, the method 110 comprises the system 10 sensing a presence of the lost item 14 to define a sensed item data in box 112, translating the sensed item data and position data for visualization of the lost item 14 to define an item image in box 114, and determining a location/position of the lost item 14 to define a position data in box 116. Moreover, the general method 110 further comprises updating an inventory list of lost objects with the item image and its corresponding data and identifying the owner 12 of the lost item 14 in box 118. As shown, the general method 110 comprises allowing manual correction of the inventory list in box 122. Furthermore, the general method 110 comprises notifying the owner 12 by way of in-vehicle/mobile notifications and allowing viewable access of the item image in box 124.

As shown in FIG. 4, the general method 110 further comprises a downloadable interactive computer/phone application in box 42 verifying ownership of the lost item to define the owner of the lost item and determining a preferred location for the owner in box 130. The general method 110 further comprises the storage facility 38 at the preferred location storing the lost item 14 in box 132 to define a stored item. In box 132, the general method further comprises the controller 40 confirming an identity of the owner 12 for retrieval of the stored item at the preferred location. Upon identity confirmation, the method further comprises allowing access to the stored item at the storage facility in box 132 for retrieval of the lost item.

Figure 5:
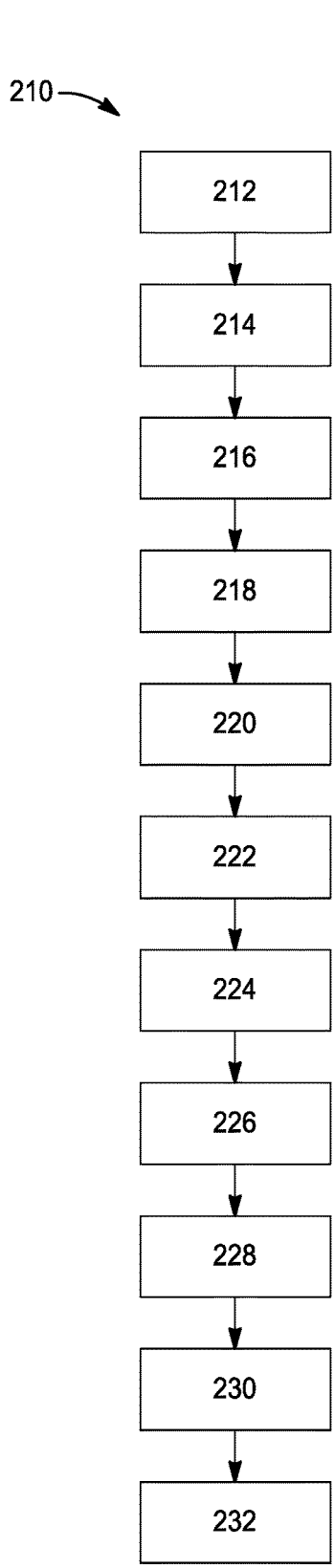
FIG. 5 is a flowchart of a method of retrieving a lost item from a compartment to an owner of the lost item implemented by the system of FIG. 1 in accordance with one example of the present disclosure.

In accordance with one example of the present disclosure, FIG. 5 depicts a flowchart of a method 210 of retrieving a lost item 14 from a compartment to an owner 12 of the lost item 14 implemented by the system 10 of FIG. 1. As shown, the method 210 comprises a step 212 of providing at least one sensor 20 to sense the lost item 14 in the vehicle compartment 18. As discussed above for the system 10, the at least one sensor 20 may be an ultrasonic sensor and is disposed in the vehicle compartment 18. However, it is to be understood that the sensor may be an ultrasonic sensor, a radio frequency identification sensor, a radar sensor, or any other suitable sensor without departing from the spirit or scope of the present disclosure.

As shown in FIG. 5, the method 210 further comprises a step 214 of sensing the lost item 14 on a point 30 relative to a spherical coordinate system 32 (FIG. 3) to define a sensed item data. As discussed, the sensor 20 may be arranged to sense the lost item 14 on a point 30 relative to a spherical coordinate system 32 to define a sensed item data. In one embodiment, the point 30 relative to the spherical coordinate system 32 is defined by a distance r, a first angle ($\theta$), and a second angle ($\varphi$). Moreover, the lost item 14 may be translated in cartesian coordinates having an x-axis, a y-axis, and a z-axis derived as, $$x = r \sin \theta \cos \varphi$$

$$y = r \sin \theta \sin \varphi$$

$$z = r \cos \theta$$

In one example, the sensor 20 is arranged to have two of roll, pitch, and yaw rotational movements when the sensor 20 senses from a fixed location in the vehicle compartment 18. That is, the sensor 20 may have a body 34 fixedly disposed in the vehicle compartment 18 and a lens 36 disposed within the body 34. Moreover, the lens 36 may be arranged for rotational movements, e.g., roll, pitch, and yaw, during operation.

In another example, the sensor 20 is arranged to have one of roll, pitch, and yaw rotational movements when the sensor 20 senses in translational movement along the x-axis such that the first angle $\theta$ is calculated as:

$$\theta = \sin^{-1} \frac{x}{r \cdot \cos \varphi}.$$

Translational movement of the sensor 20 may include forward/backward movement, side to side movement, and up/down movement. Thus, a sensor body 34 may be disposed in the vehicle compartment 18 and arranged to be movable along one of the x-axis, y-axis, and z-axis for translational movement. As an example, the sensor may have a body 34 movably disposed along a linear track (forward/backward movement) on a portion of an interior panel of the vehicle compartment 18. A lens 36 may be disposed within the body 34 and arranged for rotational movements, e.g., roll, pitch, and yaw.

In yet another example, the sensor 20 is arranged to have one of roll, pitch, and yaw rotational movements when the sensor 20 senses in translational movement along the x-axis and y-axis such that the second angle $\varphi$ is calculated as:

$$\varphi = \tan^{-1}\left(\frac{y}{x}\right).$$

As in the previous embodiment, translational movement of the sensor 20 may include forward/backward movement, side to side movement, and up/down movement. Thus, a sensor body 34 may be disposed in the vehicle compartment 18 and arranged to be movable along the x-axis and y-axis (e.g., forward/backward and side to side movements) for translational movement. For example, the sensor may have a body 34 movably disposed along a circular track on a portion of an interior panel of the vehicle compartment 18. A lens 36 may be disposed within the body 34 and arranged for rotational movement, e.g., roll, pitch, and yaw.

The method 210 further comprises determining a position of the lost item 14 in cartesian coordinates based on the sensed item data to define a position data. As discussed above, the ECU 22 is arranged to determine a position of the lost item 14 in cartesian coordinates based on the sensed item data to define a position data. The position of the lost item 14 may be determined in a number of ways. For instance, as discussed above in one example, the sensor 20 is arranged to have at least two of roll, pitch, and yaw rotational movements when the sensor 20 senses from a fixed location in the vehicle compartment 18. That is, the sensor may have a body 34 fixedly disposed in the vehicle compartment 18 and a lens 36 disposed within the body 34. Furthermore, the lens 36 may be arranged for rotational movements, e.g., roll, pitch, and yaw, during operation to sense the lost item 14.

Based on the sensed item data from the sensor 20, the lost item 14 may be translated by the ECU 22 in cartesian coordinates having an x-axis, a y-axis, and a z-axis derived as, $$x = r \sin \theta \cos \varphi$$

$$y = r \sin \theta \sin \varphi$$

$$z = r \cos \theta$$

thereby allowing the ECU 22 to determine the position of the lost item 14 in cartesian coordinates defining the position data.

The position of the lost item 14 may be determined in another suitable manner. For instance, as discussed above, the sensor 20 may be arranged to have at least one of roll, pitch, and yaw rotational movements when the sensor 20 senses from translational movement along the x-axis in the vehicle compartment 18 such that the first angle $\theta$ is calculated as:

$$\theta = \sin^{-1}\frac{x}{r \cdot \cos\varphi}.$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The position of the lost item 14 may be determined in yet another suitable manner. For instance, as discussed above in another example, the sensor 20 may be arranged to have at least one of roll, pitch, and yaw rotational movements when the sensor 20 senses from translational movement along the x-axis and y-axis in the vehicle compartment 18 such that the second angle φ is calculated as:

$$\varphi = \tan^{-1}\left(\frac{y}{x}\right),$$

Based on the sensed item data from the sensor 20, the lost item 14 may be translated by the ECU 22 in cartesian coordinates having an x-axis, a y-axis, and a z-axis derived as, $x = r \sin\theta \cos\varphi$ $y = r \sin\theta \sin\varphi$ $z = r \cos\theta$ thereby allowing the ECU 22 to determine the position of the lost item 14 in cartesian coordinates defining the position data.

The method 210 further comprises translating the sensed item data and the position data for visualization of the lost item 14 to define an item image of the lost item 14 relative to the vehicle compartment 18. As described for the system 10 above, the ECU 22 is arranged to translate the sensed item data and the position data for visualization of the lost item 14 to define an item image of the lost item 14 relative to the vehicle compartment 18. Based on the sensed item data and the position data, by way of algorithmic modules, the ECU 22 is able to translate the sensed item and the position data to the item image, thereby providing an image of the lost item 14 along with a location of thereof relative to the sensor 20 in the vehicle compartment 18. It is to be understood that the ECU 22 may comprise modules and algorithms to assist in translating the sensed item data and the position data to output the item image and provide a location of the lost item 14.

The method 210 further comprises a step 216 of updating an inventory list of lost objects to include the lost item 14 with the item image. As described above, the ECU 22 is arranged to update an inventory list of lost objects to include the lost item 14 with the item image. The inventory list is preferably stored in the ECU 22 and may comprise a "lost" database of left-behind or lost objects in the vehicle compartment 18. To detect an object has been left-behind or lost, the ECU 22 may comprise an object detection module arranged to compare images of the vehicle compartment 18. Such images may be intermittently captured by the sensor 20 as desired. The object detection module may comprise a first perception algorithm that compares images or data of the vehicle compartment 18. As new objects and new users are detected and paired, data of each new object is record in an object database. Along the same lines, left-behind or lost objects may also be detected as users enter and leave the vehicle compartment 18 with and without their respective objects. Objects detected without the paired users may be determined to be "lost" by way of the first perception algorithm. Data of each "lost" object is recorded in the "lost" database.

The method 210 further comprises a step 218 of identifying the owner 12 or at least one potential user of the lost item 14 by way of a perception algorithm. As stated above, the ECU 22 is arranged to identify the owner 12 or at least one potential user of the lost item 14 during a trip of the vehicle 16. Generally, the owner 12 or the at least one potential user of a lost item 14 may be identified by the ECU 22 by way of a user detection module. In one example, the user detection module may be arranged to compare images of the vehicle compartment 18. Such images may be intermittently captured by the sensor 20 as desired. The user detection module may comprise a second perception algorithm that compares images or data of the vehicle compartment 18. As new objects and users are detected and paired, data of each new user is recorded in a database. As lost objects are detected, the user that is paired with the lost object may be identified by way of the second perception algorithm. Data of each user having a lost object may be recorded in a "user" database.

In another example, by way of the ECU 22 with the user detection module, the at least one potential user or owner 12 of a lost item 14 can be identified by recording an identifier of the trip having a trip identification (ID) during which the lost item 14 was detected in the vehicle 16. Subsequently, the trip ID and the owner 12 or a user of the lost item 14 may be matched through a search in a database of trip IDs and users.

As mentioned above, such matching by the ECU 22 may occur in the following steps. In a first step, a new item in the vehicle 16 is identified upon vehicle entry by the user with the new item. The sensor 20 senses and identifies the new item in the vehicle. That is, based on a comparison of images/data (e.g., via the user detection module), the new item is identified in the vehicle compartment 18. Thus, the new item had not been present prior to the user entering the vehicle.

In a second step, the new item remains in the vehicle after the trip ends and/or the user paired therewith has left the vehicle. By way of a perception algorithm of the ECU 22, the item may be confirmed as a valuable item, e.g., a bag pack, a tablet, a wallet, a bag. In a third step, the item is tagged as "left behind during trip xxx," where xxx is a unique ID of the trip based on time and potentially location such as a start point and an end point.

In a fourth step, the ECU 22 having a user database that matches vehicle users with trip IDs is accessed to match the lost item 14 with its owner 12 or potential user by matching trip ID to user ID. Such database may be the same or similar to any suitable user database used for identifying users, matching a passenger with a vehicle/driver, and charging the passenger for a pickup/rental service.

Alternatively, there may be other methods of identifying the owner 12 or user of a left-behind item without departing from the spirit or scope of the present disclosure.

The method 210 further comprises a step 220 of providing notification to the owner 12 or the at least one potential user of the lost item 14. As provided above, the cloud server 24 is arranged to provide notification of the lost item 14. When the ECU 22 identifies the owner 12 or potential user of the lost item 14 as described above, the ECU 22 sends a signal to the cloud server 24 to inform or notify the user that an item has been left behind in the vehicle compartment 18. For example, the cloud server 24 may notify a user by way of an application downloaded on the user's phone. A notification may be sent to the user from the application, informing the user that a lost item 14 has been detected in the vehicle compartment 18 and that the user has been identified as a possible owner thereof. It is to be understood that the cloud server 24 may notify the user of a lost item by email, text message, phone call, voice mail, or any other suitable manner without departing from the scope or spirit of the present disclosure.

The method 210 further comprises a step 222 of providing viewable access of the item image such that the image is viewed by the owner 12 or potential user of the lost item 14. As discussed for the system 10, the cloud server 24 is arranged to provide viewable access of the item image such that the image is viewed by the owner 12 or potential user of the lost item 14. That is, the ECU 22 may transmit the item image of the lost item 14 to the cloud server 24 which may be downloaded by the user for viewable access. A user may view the item image by way of the phone application. It is to be understood that the cloud server 24 may provide viewable access of the item image by email, text message, or any other suitable manner without departing from the scope or spirit of the present disclosure.

Referring to FIG. 5, the method further comprises a step 224 of verifying ownership of the lost item 14 to define the owner 12 of the lost item 14. As discussed above, the cloud server 24 is arranged to verify ownership of the lost item 14 to define the owner 12 of the lost item 14. That is, the cloud server 24 is arranged to gather and assess at least one of the item image, the sensed item data, and the position data of the lost item. The cloud server is arranged to request with the at least one potential user a first description of the lost item 14 relative to one of the item image, the sensed item data, and the position data.

In one example, the cloud server 24 may request a general or first description of the lost item 14 such as item category (e.g. bag, card, jewelry, garment), shape, color, function, to name a few. Other descriptions may be included without departing from the spirit or scope of the present disclosure. Moreover, the cloud server 24 may send such request to the user's phone by way of a downloadable interactive phone application. Thus, the user may interactively send responses to the cloud server 24 via the application.

As such, the cloud server 24 is arranged to receive the first description from the at least one potential user and compare the first description with one of the item image, the sensed item data and the position data by way of the perception module or by any other suitable algorithmic manner. In turn, the cloud server 24 is arranged to confirm the owner 12 of the lost item 14 if the first description is uniquely consistent with one of the item image, the sensed item data, and the position data. That is, if the first description is accurately described within a predetermined probability (e.g., 75%, 80%, 85%, 90%, 95%, 100%, 75%-100%, or as desired) relative to the assessment of the item image, the sensed item data, or the position data via an algorithmic module, then the item's ownership is verified thereby defining the owner 12 of the lost item 14. In another embodiment, if the cloud server 24 determines that there is only one first description from the at least one user that matches (or is uniquely consistent with) the assessment of the lost item 14, then the item's ownership is verified thereby defining the owner 12 of the lost item 14.

If the first description is not uniquely consistent with one of the item image, the sensed item data, and the position data, then the cloud server 24 is arranged to request with the at least one potential user a second description of the lost item 14 relative to one of the item image, the sensed item data, and the position data. In one situation where the first descriptions from a plurality of potential users are similar or not uniquely consistent with the assessment of the lost item 14, a second description is requested to each of the plurality of potential users. The second description may include more specific details related to the lost item. Such details may include a variety of specific details such as time of travel, brand of jewelry, size of garment, distinguishable markings on the item, to name a few. Of course, other details may be included without departing from the spirit or scope of the present disclosure.

As such, the cloud server 24 is arranged to receive the second description from the at least on potential user and compare each second description with one of the item image, the sensed item data and the position data via the perception module or by any other suitable algorithmic manner. In turn, the cloud server 24 is arranged to confirm the owner 12 of the lost item 14 if the second description is uniquely consistent with one of the item image, the sensed item data, and the position data. That is, if the second description is accurately described within a predetermined probability (e.g., 75%, 80%, 85%, 90%, 95%, 100%, 75%-100%, or as desired) relative to the assessment of the item image, the sensed item data, or the position data via an algorithmic module, then the item's ownership is verified thereby defining the owner 12 of the lost item 14. In another embodiment, if the cloud server determines that there is only one second description that matches (or is uniquely consistent with) the assessment of the lost item 14, then the item's ownership is verified thereby defining the owner 12 of the lost item 14.

As shown in FIG. 5, the method 210 further comprises a step 226 of determining a preferred location of the owner 12 for retrieval of the lost item 14. As described above, the cloud server 24 is arranged to determine a preferred location and may include the cloud server 24 being arranged to provide the owner 12 with at least one area from which to select for retrieval of the lost item 14. The at least one area may include geographical locations from which a user may select based on preference. A selection list of at least one area may be provided via the interactive phone application mentioned previously. Via the phone application, the cloud server may provide the user with the selection list of the areas from which the user may select. In turn, the cloud server 24 is arranged to receive via the phone application from the owner a selection of one location from where to retrieve the lost item, defining the preferred location.

As depicted in FIG. 5, The method 210 further comprises a step 228 of storing the lost item at the preferred location defining a stored item. In this example, a storage facility 38 at the preferred location stores the lost item 14, defining a stored item. It is to be understood that various suitable manners (e.g., a customer representative or a robot) in which to store the lost item in the storage facility may be used without departing from the spirit or scope of the present disclosure. Moreover, the storage facility 38 may include one locker or a colony of designated lockers in which the lost item is stored for retrieval by the owner. Preferably, the storage facility 38 is disposed at the preferred location.

Referring to FIGS. 1 and 5, the method further comprises a step 230 of confirming identity of the owner 12 for retrieval of the stored item at the preferred location. Preferably, the storage facility comprises a controller 40 in communication with the cloud server 24. The controller 40 is arranged to confirm an identity of the owner 12 for retrieval of the stored item from the storage facility 38. Identity confirmation of the owner 12 may be achieved by facial recognition, fingerprint mechanism, drivers license scan, manual login and password, or any other suitable manner without departing from the spirit or scope of the present disclosure.

The method 210 further comprises a step 232 of allowing access to the stored item from the preferred location upon identity confirmation. As discussed above for the system of FIG. 1, the controller 40 is arranged to allow access to and retrieval of the stored item from the storage facility 38 upon identity confirmation. Upon identity confirmation, access to a designated locker in which the lost item is stored is provided to the owner 12 for retrieval of the stored item. It is understood that retrieval of the stored item may be automated, self-service, representative aided, or a hybrid thereof without departing from the spirit or scope of the present disclosure.

Figure 6:
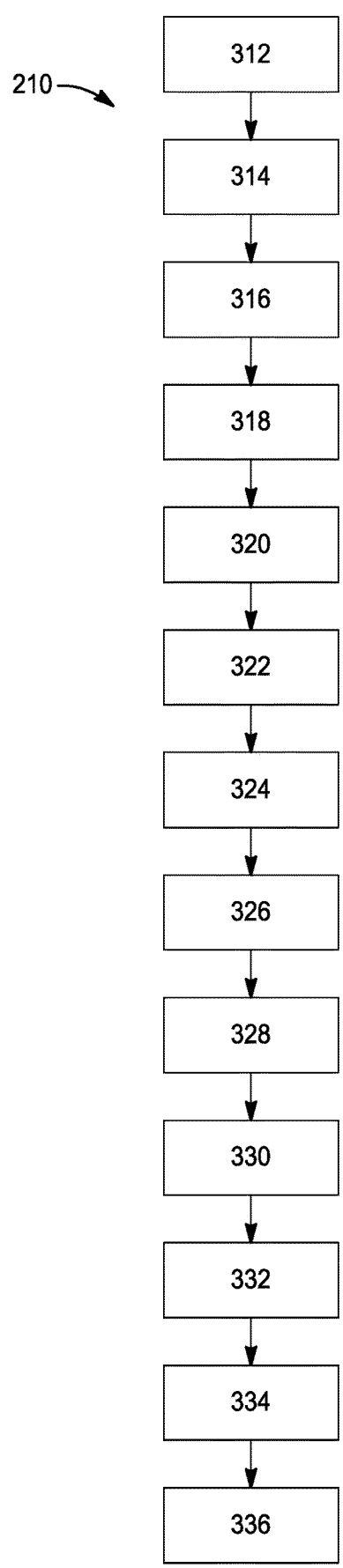
FIG. 6 is a flowchart of a method of retrieving a lost item from a compartment to an owner of the lost item implemented by the system of FIG. 1 in accordance with another example of the present disclosure.

In accordance with another example of the present disclosure, FIG. 6 depicts a flowchart of a method 310 of notifying an owner 12 of a lost item 14 in a vehicle 16 having a vehicle compartment 18 implemented by the system 10 of FIG. 1. As shown, the method 310 comprises providing at least one sensor 20 to sense the lost item 14 in the vehicle compartment 18 in box 312. Moreover, the method 310 further comprises sensing the lost item 14 on a point 30 relative to a spherical coordinate system 32 (FIG. 3) to define a sensed item data in box 314. In this aspect, the point 30 is defined by a distance r, a first angle (θ), and a second angle (φ). The lost item 14 has cartesian coordinates having an x-axis, a y-axis, and a z-axis derived as, $x = r \sin\theta \cos\varphi$ $y = r \sin\theta \sin\varphi$ $z = r \cos\theta$ The method 310 further comprises determining a position of the lost item 14 in cartesian coordinates based on the sensed item data to define a position data in box 316. The sensor 20 is arranged to have two of roll, pitch, and yaw rotational movements when the sensor 20 senses in a fixed location in the vehicle compartment 18, wherein the sensor 20 is arranged to have one of roll, pitch, and yaw rotational movements when the sensor 20 senses in movement along the x-axis such that the first angle θ is calculated as:

$$\theta = \sin^{-1}\frac{x}{r\cdot\cos\varphi}.$$

In this aspect, the sensor 20 is arranged to have one of roll, pitch, and yaw rotational movements when the sensor 20 senses in movement along the x-axis and y-axis such that the second angle φ is calculated as:

$$\varphi = \tan^{-1}\left(\frac{y}{x}\right).$$

Moreover, the method 310 comprises translating the sensed item data and the position data for visualization of the lost item 14 to define an item image of the lost item 14 relative to the vehicle compartment 18 in box 318. Further, the method 310 comprises updating an inventory list of lost objects to include the lost item 14 with the item image in box 320. Additionally, the method 310 comprises identifying the owner 12 of the lost item 14 by way of a perception algorithm in box 322. The method 310 further comprises providing notification to the owner 12 of the lost item 14 in box 324. Furthermore, the method 310 comprises providing viewable access of the item image such that the image is viewed by the owner 12 of the lost item 14 in box 326.

Additionally, the method 310 further comprises verifying ownership of the lost item to define the owner of the lost item in box 328 and determining a preferred location for the owner in box 330. The method 310 further comprises storing the lost item at the preferred location defining a stored item in box 332 and confirming identity of the owner for retrieval of the stored item at the preferred location in box 334. The method 310 further comprises allowing access to the stored item from the preferred location upon identity confirmation in box 336.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of retrieving a lost item from a vehicle having a compartment to an owner of the lost item, the method comprising:

providing at least one sensor to sense the lost item in the compartment;

detecting, by an electronic control unit (ECU) disposed in the vehicle and in communication with the at least one sensor, the lost item in the compartment to define an item image of the lost item relative to the compartment;

updating, by the ECU, an inventory list of lost objects to include the lost item with the item image;

identifying, by the ECU by comparing and matching uniquely consistent description of the lost item with the item image, at least one potential owner of the lost item by way of a perception algorithm;

providing, by the ECU, notification to the at least one potential owner of the lost item;

providing, by a cloud server disposed remotely from the vehicle and in communication with the ECU, viewable access of the item image such that the image is viewed by the at least one potential owner of the lost item;

verifying, by the cloud server by receiving from the at least one potential owner the uniquely consistent description of the lost item, ownership of the lost item to define the owner of the lost item;

determining, by the cloud server, a preferred pickup location for the owner;

storing, by a storage facility disposed at the preferred location and comprising a controller in communication with the cloud server, the lost item at the preferred location defining a stored item;

confirming, by the controller, identity of the owner for retrieval of the stored item at the preferred location; and allowing, by the controller, access to the stored item from the preferred location upon identity confirmation;

wherein detecting, by the ECU, the lost item comprises:
sensing the lost item on a point relative to a spherical coordinate system to define a sensed item data;
determining a position of the lost item in cartesian coordinates based on the sensed item data to define a position data; and
translating the sensed item data and the position data for visualization of the lost item to define the item image of the lost item relative to the compartment;
wherein the point relative to the spherical coordinate system is defined by a distance r, a first angle (θ), and a second angle (φ), wherein the lost item has cartesian coordinates having an x-axis, a y-axis, and a z-axis derived as, $x = r \sin\theta \cos\varphi$ $y = r \sin\theta \sin\varphi$ $z = r \cos\theta.$ 2. The method of claim 1, wherein the step of determining the position of the lost item comprises the sensor being arranged to have two of roll, pitch, and yaw rotational movements when the sensor senses in a fixed location in the compartment.

3. The method of claim 1, wherein the step of determining the position of the lost item comprises the sensor being arranged to have one of roll, pitch, and yaw rotational movements when the sensor senses in movement along the x-axis such that the first angle θ is calculated as:

$$\theta = \sin^{-1}\left(\frac{x}{r \cdot \cos\varphi}\right).$$

4. The method of claim 1, wherein the step of determining the position of the lost item comprises the sensor being arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

5. The method of claim 1, wherein the step of verifying comprises:
assessing the item image, the sensed item data, and the position data of the lost item;
requesting with the at least one potential owner a first description of the lost item relative to one of the item image, the sensed item data, and the position data;
receiving the first description of the lost item;
comparing the first description with one of the item image, the sensed item data and the position data;
confirming the owner of the lost item if the first description is uniquely consistent with one of the item image, the sensed item data, and the position data.

6. The method of claim 5, wherein the wherein the step of verifying further comprises:
requesting with the at least one potential owner a second description of the lost item relative to one of the item image, the sensed item data, and the position data if the first description is not uniquely consistent with one of the item image, the sensed item data, and the position data;
receiving the first description of the lost item;
comparing the second description with one of the item image, the sensed item data and the position data;
confirming the owner of the lost item when the second description is uniquely consistent with one of the item image, the sensed item data, and the position data.

7. The method of claim 1 wherein the step of determining the preferred pickup location comprises:
providing the owner with at least one location from which to select for retrieval of the lost item; and
receiving from the owner a selection of one location from where to retrieve the lost item to define the preferred location.

8. The method of claim 1 wherein the at least on sensor is one of an ultrasonic sensor and an RFID sensor.

9. The method of claim 1, wherein the step of identifying the owner of the lost item comprises:
scanning the compartment;
detecting the potential owner in the compartment;
pairing the potential owner with the lost item by way of the perception algorithm.

10. A system for notifying an owner of a lost item in a vehicle having a compartment, the system comprising:
at least one sensor disposed in the compartment and arranged to sense the lost item on a point relative to a spherical coordinate system to define a sensed item data;
an electronic control unit (ECU) disposed in the vehicle and in communication with the at least one sensor, the ECU arranged to determine a position of the lost item in cartesian coordinates based on the sensed item data to define a position data, the ECU arranged to translate the sensed item data and the position data for visualization of the lost item to define an item image of the lost item relative to the compartment, the ECU arranged to update an inventory list of lost objects to include the lost item with the item image, the ECU arranged to identify at least one potential owner of the lost item by way of a perception algorithm by comparing and matching uniquely consistent description of the lost item with the item image; and
a cloud server disposed remotely from the vehicle and in communication with the ECU, the cloud server arranged to provide notification to the at least one potential owner of the lost item, the cloud server arranged to provide viewable access of the item image such that the image is viewed by the at least one potential owner of the lost item, the cloud server arranged to verify ownership of the lost item to define the owner of the lost item by receiving from the at least one potential owner the uniquely consistent description of the lost item, the cloud server arranged to determine a preferred location of the owner; and
a storage facility in which the lost item is stored to define a stored item, the storage facility disposed at the preferred location and comprising a controller in communication with the cloud server, the controller arranged to confirm an identity of the owner for retrieval of the stored item from the storage facility, the controller arranged to allow access to the stored item from the storage facility upon identity confirmation;
wherein the point relative to the spherical coordinate system is defined by a distance r, a first angle (θ), and a second angle (φ), wherein the lost item has cartesian coordinates having an x-axis, a y-axis, and a z-axis derived as, $$x = r \sin \theta \cos \varphi$$

$$y = r \sin \theta \sin \varphi$$

$$z = r \cos \theta.$$

11. The system of claim 10, wherein the ECU is arranged to determine a position of the lost item comprises the sensor being arranged to have two of roll, pitch, and yaw rotational movements when the sensor senses in a fixed location in the compartment.

12. The system of claim 10, wherein the ECU is arranged to determine a position of the lost item comprises the sensor being arranged to have one of roll, pitch, and yaw rotational movements when the sensor senses in movement along the x-axis such that the first angle θ is calculated as:

$$\theta = \sin^{-1}\left(\frac{x}{r \cdot \cos \varphi}\right).$$

13. The system of claim 10, wherein the ECU is arranged to determine a position of the lost item comprises the sensor being arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

14. The system of claim 10, wherein the cloud server is arranged to verify ownership of the lost item comprises the cloud server being arranged to assess the item image, the sensed item data, and the position data of the lost item,
wherein the cloud server is arranged to request with the at least one potential owner a first description of the lost item relative to one of the item image, the sensed item data, and the position data,
wherein the cloud server is arranged to receive the first description of the lost item, wherein the cloud server is arranged to compare the first description with one of the item image, the sensed item data and the position data,
wherein the cloud server is arranged to confirm the owner of the lost item if the first description is uniquely consistent with one of the item image, the sensed item data, and the position data.

15. The system of claim 14, wherein the cloud server is arranged to verify ownership of the lost item further comprises the cloud server being arranged to request with the at least one potential owner a second description of the lost item relative to one of the item image, the sensed item data, and the position data if the first description is not uniquely consistent with one of the item image, the sensed item data, and the position data,
wherein the cloud server is arranged to receive the first description of the lost item;
wherein the cloud server is arranged to compare the second description with one of the item image, the sensed item data and the position data;
wherein the cloud server is arranged to confirm the owner of the lost item when the second description is uniquely consistent with one of the item image, the sensed item data, and the position data.

16. The system of claim 10 wherein the cloud server is arranged to determine a preferred location of the owner comprises the cloud server being arranged to provide the owner with at least one location from which to select for retrieval of the lost item,
wherein the cloud server is arranged to receive from the owner a selection of one location from where to retrieve the lost item.

17. The system of claim 10 wherein the at least on sensor is one of an ultrasonic sensor and an RFID sensor.

18. A method of retrieving a lost item in a vehicle compartment for an owner of the lost item, the method comprising:
providing at least one sensor to sense the lost item in the vehicle compartment;
sensing, by an electronic control unit (ECU) disposed in the vehicle compartment and in communication with the at least one sensor, the lost item on a point relative to a spherical coordinate system to define a sensed item data, the point being defined by a distance r, a first angle (θ), and a second angle (φ), wherein the lost item has cartesian coordinates having an x-axis, a y-axis, and a z-axis derived as, $$x = r \sin \theta \cos \varphi$$

$$y = r \sin \theta \sin \varphi$$

$$z = r \cos \theta$$

determining, by the ECU, a position of the lost item in cartesian coordinates based on the sensed item data to define a position data, wherein the sensor is arranged to have two of roll, pitch, and yaw rotational movements when the sensor senses in a fixed location in the vehicle compartment, wherein the sensor is arranged to have one of roll, pitch, and yaw rotational movements when the sensor senses in movement along the x-axis such that the first angle θ is calculated as:

$$\theta = \sin^{-1}\left(\frac{x}{r \cdot \cos \varphi}\right),$$

wherein the sensor is arranged to have one of roll, pitch, and yaw rotational movements when the sensor senses in movement along the x-axis and y-axis such that the second angle φ is calculated as:

$$\varphi = \tan^{-1}\left(\frac{y}{x}\right).$$

translating, by the ECU, the sensed item data and the position data for visualization of the lost item to define an item image of the lost item relative to the vehicle compartment;
updating, by the ECU, an inventory list of lost objects to include the lost item with the item image;
identifying, by the ECU by comparing and matching uniquely consistent description of the lost item with the item image, at least one potential owner of the lost item by way of a perception algorithm;
providing, by the ECU, notification to the owner of the lost item;
providing, by a cloud server disposed remotely from the vehicle and in communication with the ECU, viewable access of the item image such that the image is viewed by the owner of the lost item;

verifying, by the cloud server by receiving from the at least one potential owner the uniquely consistent description of the lost item, ownership of the lost item to define the owner of the lost item;
determining, by the cloud server, a preferred pickup location for the owner;
storing, by a storage facility disposed at the preferred location and comprising a controller in communication with the cloud server, the lost item at the preferred location defining a stored item;
confirming, by the controller, identity of the owner for retrieval of the stored item at the preferred location; and
allowing, by the controller, access to the stored item from the preferred location upon identity confirmation.

* * * * *